US012808513B1

(12) United States Patent
Zhong

(10) Patent No.: US 12,808,513 B1
(45) Date of Patent: Nov. 24, 2026

(54) SUNLIGHT SIMULATION DEVICE AND LIFTABLE SUNLIGHT LAMP

(71) Applicant: Shenzhen Huipin Design Co., Ltd, Shenzhen (CN)

(72) Inventor: Feiyan Zhong, Shenzhen (CN)

(73) Assignee: Shenzhen Huipin Design Co., Ltd, Shenzhen (CN)

(*) Notice: Subject to any disclaimer, the term of this patent is extended or adjusted under 35 U.S.C. 154(b) by 0 days.

(21) Appl. No.: 19/342,593

(22) Filed: Sep. 28, 2025

(30) Foreign Application Priority Data

Sep. 15, 2025 (CN) ......................... 202521983940.7

(51) Int. Cl.

| | |
|---|---|
| ***F21V 13/02*** | (2006.01) |
| ***F21V 5/00*** | (2018.01) |
| ***F21V 7/00*** | (2006.01) |
| ***F21V 7/04*** | (2006.01) |
| ***F21V 9/40*** | (2018.01) |
| ***F21V 23/04*** | (2006.01) |

(Continued)

(52) U.S. Cl.
CPC ................ *F21V 13/02* (2013.01); *F21V 5/00* (2013.01); *F21V 7/0066* (2013.01); *F21V 7/043* (2013.01); *F21V 9/40* (2018.02); *F21V 23/04* (2013.01); *F21Y 2105/16* (2016.08); *F21Y 2105/18* (2016.08); *F21Y 2115/10* (2016.08)

(58) Field of Classification Search
CPC .......... F21V 13/02; F21V 5/00; F21V 7/0066; F21V 7/043; F21V 9/40; F21V 23/04; F21Y 2105/16; F21Y 2105/18; F21Y 2115/10
See application file for complete search history.

(56) References Cited

U.S. PATENT DOCUMENTS

2007/0206901 A1* 9/2007 Bonitatibus ............. F21S 8/006 385/48
2014/0185285 A1* 7/2014 Jorgensen ............... F21V 5/008 362/232

(Continued)

FOREIGN PATENT DOCUMENTS

CN 219757699 U * 9/2023
EP 3392556 B1 * 12/2020 .............. F21V 5/007

OTHER PUBLICATIONS

CN219757699U Sunlight simulation device and sunlight focusing test system for vehicle lamp, 5 pages. (Year: 2026).*

(Continued)

*Primary Examiner* — Tuyen K Vo

(57) ABSTRACT

The present utility model relates to a sunlight simulation device, including: a light assembly, including a first light source and a plurality of second light sources, wherein the plurality of second light sources are circumferentially arranged at intervals, and the first light source is located at a center of the plurality of second light sources; and a light guide plate, fitted against the light assembly, wherein the light guide plate is fixedly provided with a light concentrating tube, the light concentrating tube is axially provided with a light guide hole penetrating through two ends, the first light source is disposed in alignment with one end of the light concentrating tube, and light from the first light source is emitted outward along the light guide hole. The present utility model aims to solve the problems of poor sunlight simulation effect and high maintenance costs of conventional simulation devices.

15 Claims, 5 Drawing Sheets

(51) Int. Cl.

| | |
|---|---|
| *F21Y 105/16* | (2016.01) |
| *F21Y 105/18* | (2016.01) |
| *F21Y 115/10* | (2016.01) |

(56) References Cited

U.S. PATENT DOCUMENTS

| | | | | |
|---|---|---|---|---|
| 2020/0356463 | A1* | 11/2020 | Jaros | G06F 11/3688 |
| 2021/0062988 | A1* | 3/2021 | Ho | F21S 6/001 |
| 2021/0318485 | A1* | 10/2021 | Dau | G02B 6/0046 |
| 2022/0341565 | A1* | 10/2022 | Rasmussen | G02B 6/0078 |

OTHER PUBLICATIONS

CN110345401A A modularizing simulating filament structure, 13 pages. (Year: 2026).*

* cited by examiner

SUNLIGHT SIMULATION DEVICE AND LIFTABLE SUNLIGHT LAMP

CROSS-REFERENCE TO RELATED APPLICATIONS

The application claims priority of Chinese patent application NO. 202521983940.7, filed on Sep. 15, 2025, which is incorporated herein by reference in its entireties.

TECHNICAL FIELD

The present utility model relates to the technical field of lighting, and in particular, to a sunlight simulation device.

BACKGROUND

In daily life, as people's requirements for the quality of the surrounding lighting environment continue to increase, light devices that can simulate the natural sunlight effect are gradually attracting attention. Natural sunlight has not only the characteristics of high central brightness and concentrated light, but also a soft peripheral halo. This unique lighting effect can create a warm and comfortable visual experience, making sunlight lamps widely used in multiple scenes such as indoor lighting, photographic fill light, stage lighting, and psychological healing lamps.

Currently, light devices that simulate the sun effect on the market usually use a single light source in conjunction with a simple lens or a reflective structure to achieve light convergence and diffusion. However, conventional sunlight simulation structures generally have the following shortcomings: for example, the light uniformity is insufficient, and it is difficult for the light to simultaneously meet the requirements of central light concentration in combination with peripheral halo softness, resulting in a stiff sunlight simulation effect and a lack of the sense of layering. Moreover, the existing sunlight simulation device has a complex structure and high manufacturing and maintenance costs, and is prone to damage.

SUMMARY

The present utility model aims to provide a sunlight simulation device, so as to solve the problems of poor sunlight simulation effect, complex structure, and high maintenance costs of conventional simulation devices.

To solve the above technical problems, the present utility model adopts the following technical solution:

A sunlight simulation device, comprising:

a light assembly, comprising a first light source and a plurality of second light sources, wherein the plurality of second light sources are circumferentially arranged at intervals, and the first light source is located at a center of the plurality of second light sources; and a light guide plate, fitted against the light assembly, wherein the light guide plate is fixedly provided with a light concentrating tube, the light concentrating tube is axially provided with a light guide hole penetrating through two ends, the first light source is disposed in alignment with one end of the light concentrating tube, and light from the first light source is emitted outward along the light guide hole.

It can be seen from the above technical solution that the embodiments of the present utility model have at least the following advantages and positive effects:

According to the sunlight simulation device of the embodiment of the present utility model, a light assembly includes a first light source and a plurality of second light sources, the plurality of second light sources are arranged around the periphery of the first light source, a light guide plate is fitted against the light assembly, the light guide plate is provided with a light concentrating tube, the light concentrating tube is axially provided with a light guide hole, the first light source is located at one end of the light guide hole, light from the first light source is emitted outward along the light guide hole, the light guide hole reflects and concentrates the light from the first light source, the light from the first light source is concentrated by the light concentrating tube, and the second light sources around the first light source are subjected to light homogenization to form a halo, thereby achieving a more realistic effect of simulating sun irradiation. Moreover, the sunlight simulation device has a simple structure and greatly reduces costs.

BRIEF DESCRIPTION OF THE DRAWINGS

To more clearly illustrate the embodiments of the present utility model or the technical solutions in the prior art, the following briefly introduces the drawings required for use in the embodiments or the description of the prior art. Obviously, the drawings described below are only some embodiments of the present utility model. For those of ordinary skill in the art, other drawings can be obtained based on the structures shown in these drawings without paying any creative work.

REFERENCE NUMERALS ARE ILLUSTRATED AS FOLLOWS

1. Sunlight simulation device;

10. Light assembly; 11. First light source; 12. Second light source; 13. Control board;

20. Light guide plate; 21. Light concentrating tube; 211. Light guide hole; 22. Light shielding wall; 23. Light through hole;

30. Light homogenizing assembly; 31. Light homogenizing sheet; 311. Avoidance hole; 32. Light transmitting plate;

4. Lifting device; 41. Slide rail; 411. Sliding groove; 42. Slide block; 43. Slide plate; 431. Driving groove;

5. Driving member; 51. Driving motor; 52. First gear; 53. Second gear; 54. Third gear; 541. Driving column;

6. Housing; 61. Environmental assembly; 7. Auxiliary light panel; 8. Sound source assembly; 9. Control assembly.

DETAILED DESCRIPTION OF THE EMBODIMENTS

Exemplary embodiments that embody the features and advantages of the present utility model will be described in detail in the following description. It should be understood that the present utility model can have various variations in different embodiments without departing from the scope of the present utility model, and the descriptions and illustrations therein are essentially for illustrative purposes rather than for limiting the present utility model.

In addition, the terms “first” and “second” are used for descriptive purposes only and should not be understood as indicating or implying relative importance or implicitly indicating the quantity of the indicated technical features. Therefore, features defined with “first” or “second” may explicitly or implicitly include one or more of the features. In the description of the present utility model, “a plurality of” means two or more, unless otherwise clearly defined.

In the description of the present utility model, it should be noted that, unless otherwise clearly specified and defined, the terms “arranged”, “connecting”, and “connection” should be understood in a broad sense. For example, it may be a fixed connection, a detachable connection, or an integral connection; it may be a mechanical connection or an electrical connection; it may be a direct connection, an indirect connection through an intermediate medium, or an internal communication of two elements. For those of ordinary skill in the art, the specific meanings of the above terms in the present utility model can be understood according to specific circumstances.

Figure 1:
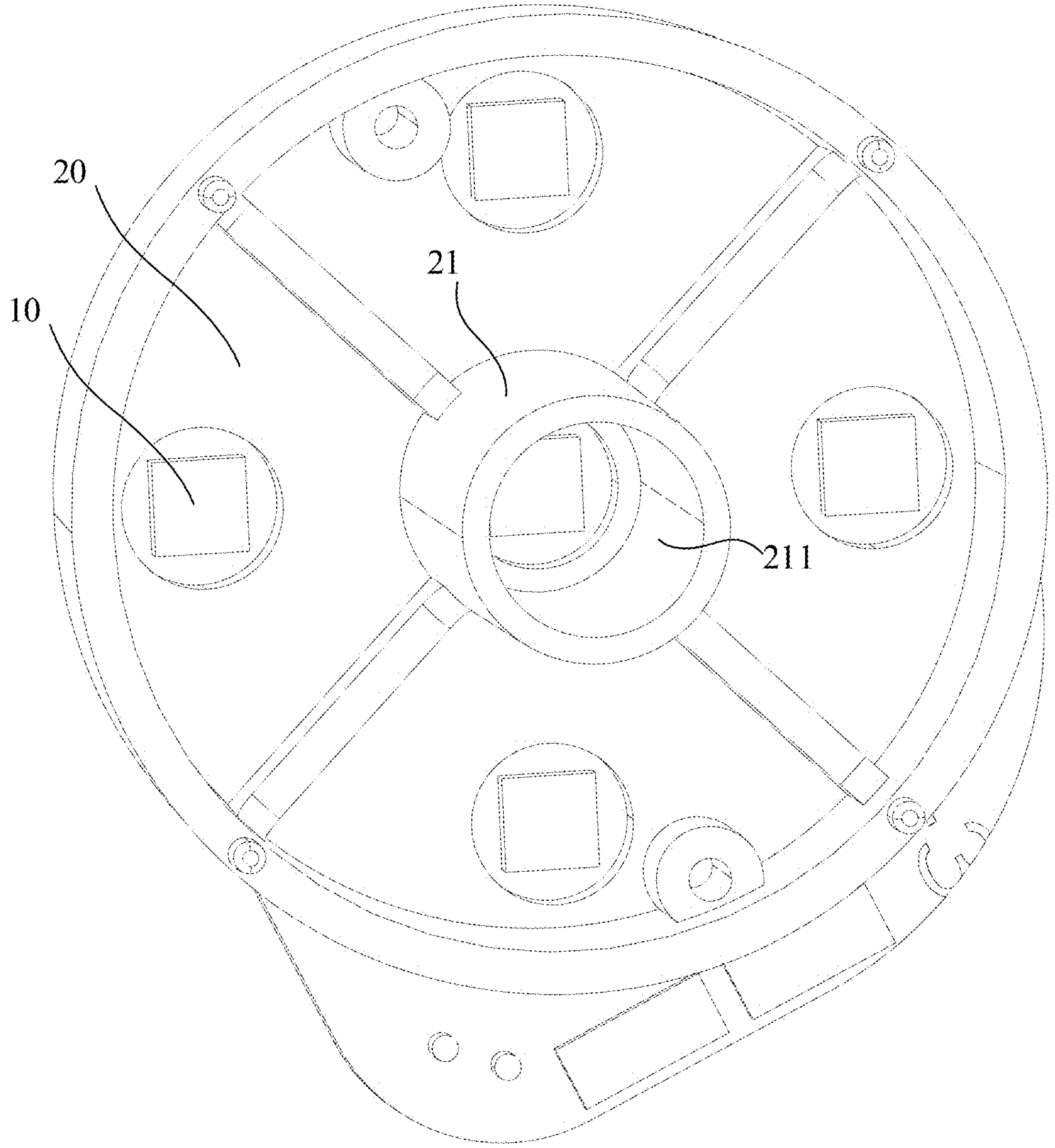
FIG. 1 is a schematic structural diagram of a sunlight simulation device of the present utility model.
Figure 2:
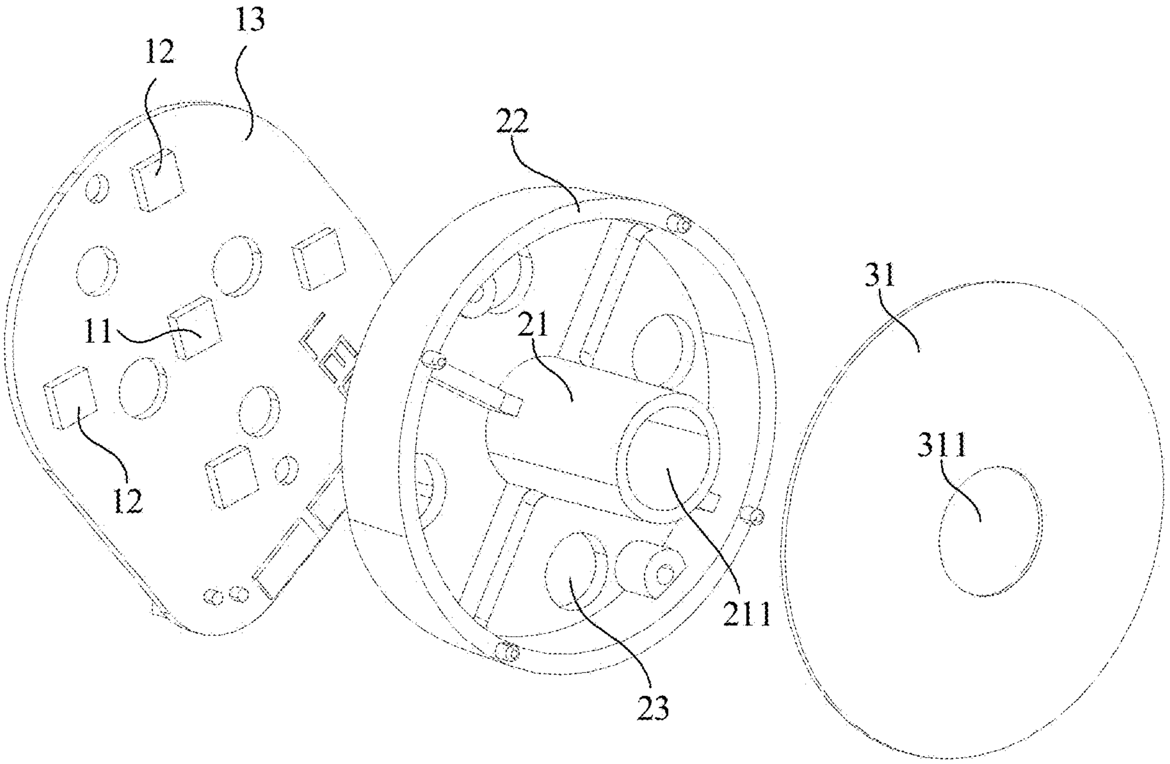
FIG. 2 is a schematic diagram of an exploded structure of a sunlight simulation device of the present utility model.
Figure 3:
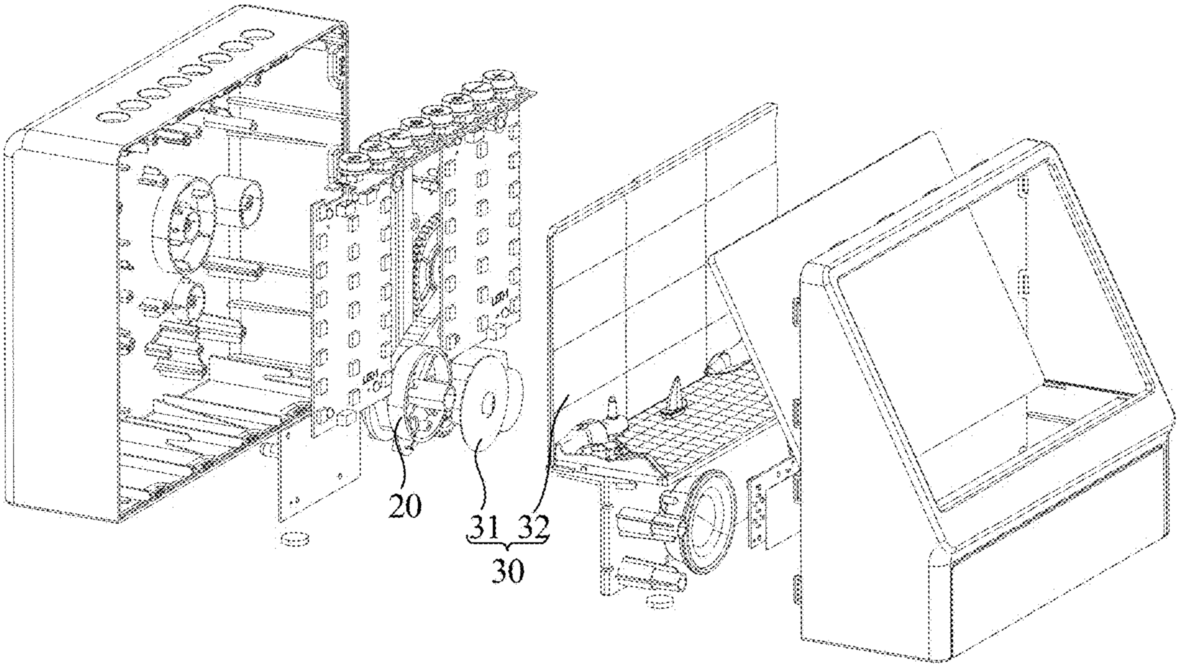
FIG. 3 is a schematic diagram of a use exploded structure of a sunlight simulation device of the present utility model.

Referring to FIG. 1 to FIG. 3, the present utility model provides a sunlight simulation device 1 for simulating the sun irradiation effect and generating sunlight with uniform light and a halo, which can be applied to the sun simulation effect in sunlight lamps and toys in life.

Further, the sunlight simulation device 1 includes a light assembly 10 and a light guide plate 20. The light assembly 10 includes a first light source 11 and a plurality of second light sources 12. The plurality of second light sources 12 are circumferentially arranged at intervals. The first light source 11 is located at a center of the plurality of second light sources 12. The light guide plate 20 is fitted against the light assembly 10. The light guide plate 20 is fixedly provided with a light concentrating tube 21. The axial extension direction of the light concentrating tube 21 is the same as the irradiation direction of the first light source 11. The light concentrating tube 21 is axially provided with a light guide hole 211 penetrating through two ends. The first light source 11 is located at one end of the light concentrating tube 21. Light from the first light source 11 is emitted outward along the light guide hole 211, so that the light concentrating tube 21 reflects and concentrates the light from the first light source 11 to form a bright spot in the center. The sunlight simulation device 1 further includes a light homogenizing assembly 30. The light homogenizing assembly 30 is disposed on one side of the light assembly 10 to perform light homogenization and softening, so that a halo is formed around the central bright spot, thereby improving the sunlight simulation effect and increasing the sense of layering. The sunlight simulation device 1 concentrates the light from the first light source 11 via the light concentrating tube 21, and performs light homogenization on the surrounding second light sources 12 via the light homogenizing assembly 30 to form a halo, thereby achieving the effect of simulating sun irradiation. Moreover, the sunlight simulation device 1 has a simple structure and greatly reduces costs.

The first light source 11 and the second light sources 12 are configured to simulate the central light and the surrounding halo of sunlight, respectively. The plurality of second light sources 12 surround to form an approximately circular structure, so that the first light source 11 is located at the center of the circular structure. First light is concentrated by the light concentrating tube 21 to form a bright spot, simulating the central bright spot of sunlight. The light homogenizing assembly 30 performs light homogenization on the second light sources 12, thereby producing an effect of light gradually diverging from the center to the outside, so that the central light bright spot is combined with the surrounding soft light to form a layered progressive effect, thereby achieving a sunlight irradiation simulation effect.

Further, an inner wall of the light guide hole 211 is provided with a smooth reflective surface to reflect and concentrate the light. In this embodiment, the shape of the light guide hole 211 is the same as that of the light concentrating tube 21, both of which are of cylindrical structures. The light guide hole 211 is formed at the center of the light concentrating tube 21, and the axial direction of the light guide hole 211 is the same as that of the light concentrating tube 21. Since light propagates in a divergent manner, light from a single light source will diffuse evenly around a hemisphere and mix with the surrounding light, failing to form a bright core. This will result in an unclear outline of the sun in the sunlight effect simulation. In the present application, the light concentrating tube 21 is aligned with the first light source 11, the light from the first light source 11 is located at one end of the light guide hole 211, and the light concentrating tube 21 limits the light from the first light source 11 from diffusing to the surroundings, so that the light can only be emitted through the other end of the light guide hole 211, thereby forming a circular light spot with a relatively clear boundary and bright concentration at an outlet end, achieving the effect of simulating the sun. Specifically, a reflective surface is disposed on the inner wall of the light guide hole 211, and the reflective surface is made of a high-reflectivity coating, such as a diffuse reflection coating of barium sulfate paint or a magnesium oxide coating. The light entering the light guide hole 211 will be diffusely reflected multiple times by the reflective surface. After multiple diffuse reflections, the light will be fully mixed in the light concentrating tube 21 to eliminate the problem of uneven brightness of the first light source 11 itself, so that a light output end of the light guide hole 211 will not produce flare. At the same time, the light will be emitted along the axis of the light guide hole 211 without interfering with the surrounding light.

Further, a light shielding wall 22 is disposed protruding from one side of the light guide plate 20 where the light concentrating tube 21 is located, and the light shielding wall 22 extends circumferentially along an edge of the light guide plate 20 and is connected end to end. The light shielding wall 22 is configured to block light from the second light sources 12 from being emitted outward along the edge of the light guide plate 20. The light shielding wall 22 extends and closes along the edge of the light guide plate 20 to form an annular blocking wall. When the light from the second light sources 12 is irradiated, the light diverges in all directions. When the light diverges to the edge of the light guide plate 20, the light is blocked by the light shielding wall 22, resulting in multiple reflections, so that the light only propagates toward the front of the light guide plate 20, to form a uniform and soft halo, avoiding uneven brightness caused by external structural interference and improving the purity of the halo.

Further, the light guide plate 20 is provided with a plurality of light through holes 23, the light through holes 23 are aligned with the second light sources 12, and the plurality of light through holes 23 are located within an enclosed range of the light shielding wall 22. In this embodiment, the second light sources 12 are located on one side of the light guide plate 20 facing away from the light concentrating tube 21, and the light through holes 23 pass through the light guide plate 20 so that the light from the second light sources 12 can be irradiated through the light through holes 23. The number of the light through holes 23 is the same as the number of the second light sources 12, and the light through holes 23 are circumferentially formed around the light concentrating tube 21. The plurality of light through holes 23 are all located within the enclosed range of the light shielding wall 22, so that the light from the plurality of second light sources 12 is all located within a blocking range of the light shielding wall 22. It is understandable that when the second light sources 12 are located on one side of the light guide plate 20 where the light concentrating tube 21 is located, the light through holes 23 may not be provided.

Further, the light guide plate 20 is of a circular structure, and the light concentrating tube 21 is located at a center of the light guide plate 20. In this embodiment, the light guide plate 20 is circular to reflect a circular light ring, and the plurality of second light sources 12 are distributed circumferentially along the edge of the circular light guide plate 20. The light concentrating tube 21 is located at the center of the circular light guide plate 20, so that when directly facing the end of the light concentrating tube 21, the first light source 11 is exactly located at the center of the entire circular light ring, thereby ensuring that the simulated sun is located at the center of the simulated halo.

Further, four second light sources 12 are provided, and the four second light sources 12 are arranged at equal intervals along a circumference direction of the light guide plate 20. In this embodiment, the second light sources 12 are evenly distributed along the circular light guide plate 20, so that equal amounts of light are distributed in the same area to form a uniform lighting effect, making the formed halo complete and uniform. It is understandable that other numbers of second light sources 12 may also be set, as long as each light source is equidistantly distributed to ensure uniform lighting.

Further, the light homogenizing assembly 30 includes a light homogenizing sheet 31 fitted against the light guide plate 20, the light homogenizing sheet 31 is provided with an avoidance hole 311 for avoiding the light concentrating tube 21, and the light homogenizing sheet 31 covers a front of the plurality of second light sources 12 to form a halo. In this embodiment, the light homogenizing sheet 31 is a translucent sheet of light transmitting paper. The light homogenizing sheet 31 is disposed on one side of the light guide plate 20 where the light concentrating tube 21 is located, and the light homogenizing sheet 31 covers an upper edge of the circumferentially enclosed light shielding wall 22, so that a light homogenizing space is formed between the light homogenizing sheet 31 and the light guide plate 20 in a covered mode. The light homogenizing sheet 31 completely covers the second light sources 12. The light homogenizing sheet 31 is provided with an avoidance hole 311 for avoiding the light concentrating tube 21. The avoidance hole 311 has the same cross-sectional shape as the light concentrating tube 21. One end of the light concentrating tube 21 is provided through the avoidance hole 311 so that the light from the first light source 11 is not blocked by the light homogenizing sheet 31, thereby making the first light source 11 form a bright spot in the center. The light from the second light sources 12 is scattered and homogenized after passing through the light homogenizing sheet 31, and multiple discretely spaced light spots are mixed into a uniform and soft circular halo. At the same time, the bright spot formed by the first light source 11 is located in the center of the circular halo, thereby forming a halo surrounding the bright spot of the first light source 11, so that the bright spot represents the sun, and the surrounding circular halo represents the halo around the sun, thereby forming an effect of simulating sunlight.

Further, the light homogenizing assembly 30 further includes a light transmitting plate 32, and the light transmitting plate 32 is disposed in front of the light guide plate 20 and located on irradiation paths of the first light source 11 and the second light sources 12. In the direction of light irradiation, the light transmitting plate 32 is located on a rear side of the light guide plate 20 and the light homogenizing sheet 31, and the light passes through the light guide plate 20, the light homogenizing sheet 31, and the light transmitting plate 32 in sequence, so that the light from the first light source 11 and the second light sources 12 passes through the light transmitting plate 32 and irradiates an external environment. In this embodiment, the surface of the light transmitting plate 32 is slightly frosted to scatter strong light and eliminate glare, thereby improving the comfort of the human eye under directly exposed to the light. Moreover, the light transmitting plate 32 also serves as a protective function to prevent external debris from damaging the light assembly 10.

Further, the light assembly 10 further includes a control board 13, and the first light source 11 and the second light sources 12 are LED lamp beads embedded in the control board 13. In this embodiment, the control board 13 is connected to a power source, so that the first light source 11 and the second light sources 12 are powered by the control board 13. The power source may be in the form of battery power or a direct plug connection. The first light source 11 and the second light sources 12 are LED lamp beads. The control board 13 adjusts the brightness of the first light source 11 and the second light sources 12 to simulate the real-time dynamic light effect change of sunlight to meet the needs of different scenes. It is understandable that the control board 13 is a PCB board, and the first light source 11 and the second light sources 12 are embedded in the control board 13 according to a preset arrangement, thereby simplifying the internal wiring, making the overall structure more compact, and saving space. It should be noted that the first light source 11 may be a high-brightness, high-color temperature LED lamp bead to simulate the bright core of the sun, and the second light source 12 may be an LED lamp bead with a different color temperature from the first light source 11 to enhance the sense of layering of the light source effect.

Figure 4:
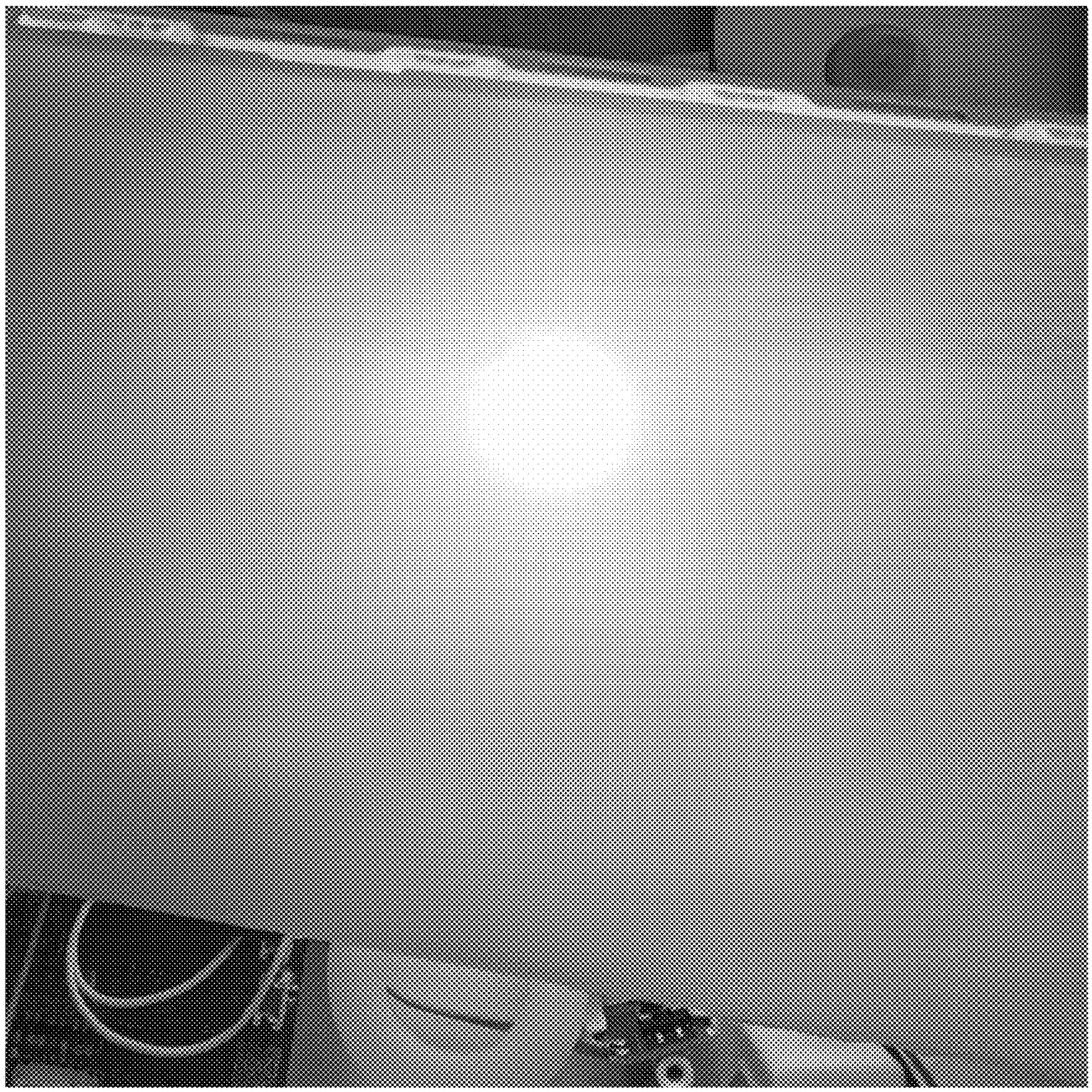
FIG. 4 is an effect diagram of a sunlight simulation device of the present utility model in use.
Figure 5:
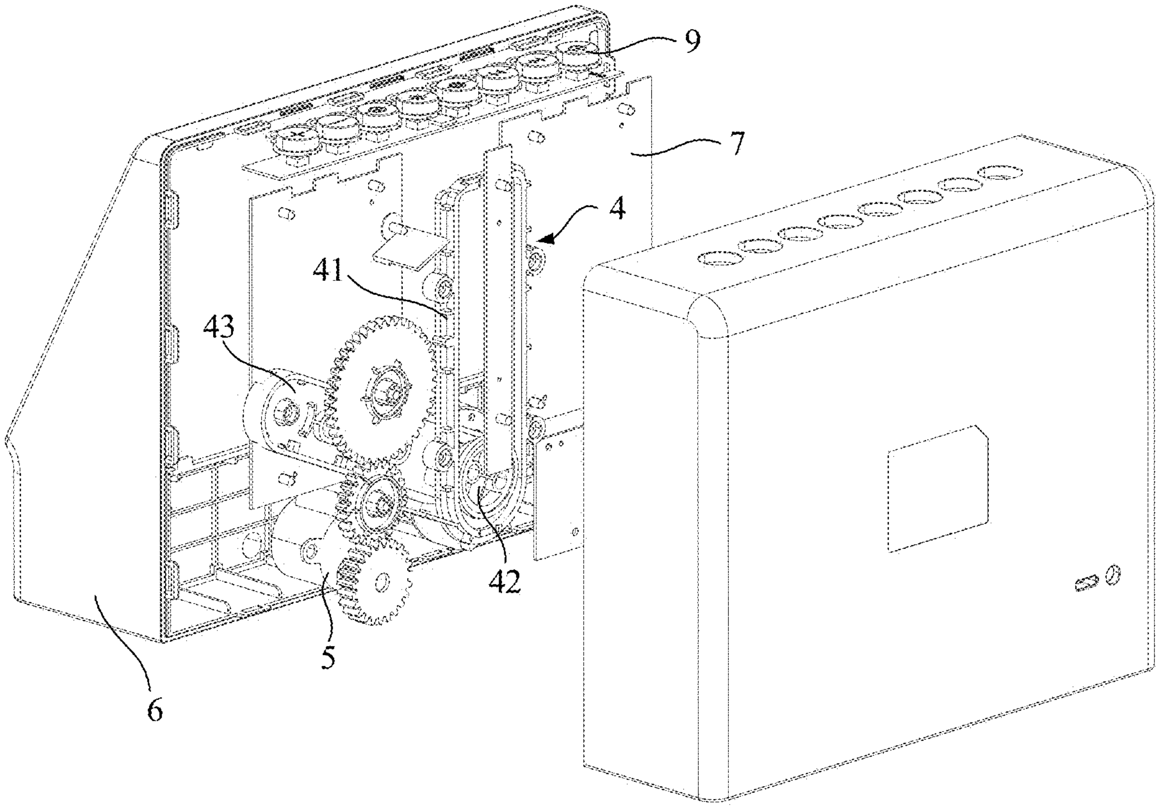
FIG. 5 is a schematic diagram of a first exploded structure of a liftable sunlight lamp of the present utility model.
Figure 6:
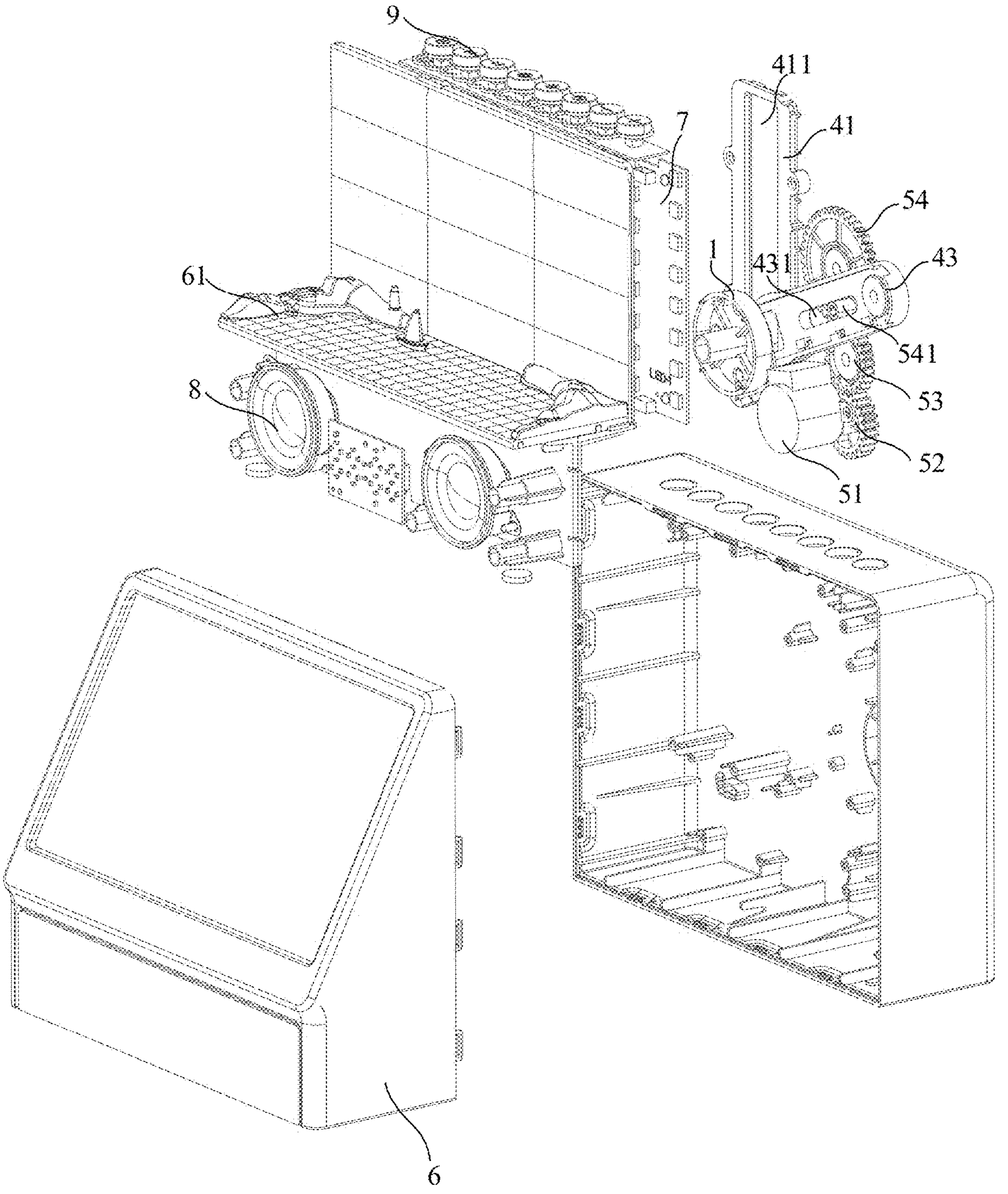
FIG. 6 is a schematic diagram of a second exploded structure of a liftable sunlight lamp of the present utility model.

Referring to FIG. 4 and FIG. 5, the present application discloses a liftable sunlight lamp, including the sunlight simulation device 1 mentioned above, a lifting device 4, a driving member 5, and a housing 6, wherein the sunlight simulation device 1 is mounted on the lifting device 4, and the driving member 5 drives the lifting device 4 to move so as to drive the sunlight simulation device 1 to move up and down, so as to simulate the rising and setting of the sun. The housing 6 is disposed outside the sunlight simulation device 1, the lifting device 4, and the driving member 5.

Specifically, the lifting device 4 includes a slide rail 41, a slide block 42, and a slide plate 43. The slide rail 41 extends vertically. The slide rail 41 is provided with a sliding groove 411 for the slide block 42 to slide. The sliding groove 411 extends vertically. The slide block 42 slides vertically along the sliding groove 411. The sunlight simulation device 1 is fixedly mounted on the slide block 42 to drive the sunlight simulation device 1 to rise and fall.

Further, an inner wall of the sliding groove 411 protrudes and extends toward the center, so that an inner wall edge of the sliding groove 411 is clamped between the slide block 42 and the sunlight simulation device 1 to prevent the slide block 42 and the sunlight simulation device 1 from detaching from the slide rail 41 when sliding. One end of the slide plate 43 is connected to the slide block 42. When the slide plate 43 moves up and down, the slide block 42 is driven to slide up and down along the sliding groove 411.

The driving member 5 includes a driving motor 51 and a gear, the gear is disposed between the driving motor 5 and the slide plate 43, and the driving motor 5 drives the gear to rotate so as to drive the slide plate 43 in a transmission mode to move. Specifically, in this embodiment, three gears are provided and are a first gear 52, a second gear 53, and a third gear 54, respectively, for speed regulation. A driving end of the driving motor 51 is connected to the first gear 52 and drives the first gear to rotate. The second gear 53 is respectively engaged with the first gear 52 and the third gear 54, and the third gear 54 drives the slide plate 43 to move. A transversely extending driving groove 431 is formed in the slide plate 43. A driving column 541 inserted into the driving groove 431 is disposed on a side surface of the third gear 54. The driving column 541 is capable of relatively moving within the driving groove 431.

When the driving motor 51 is started, the first gear 52 is in transmission to drive the third gear 54 to rotate. At this time, a moving path of rotation of the driving column 541 can be decomposed into lateral movement and vertical movement. The driving column 541 performs relative movement in the lateral path in the driving groove 431. The vertical movement of the driving column 541 drives the vertical movement of the slide plate 43, and then the slide plate 43 drives the slide block 42 to move vertically along the sliding groove 411, thereby achieving the rising and falling of the sunlight simulation device 1. Specifically, a user can control the driving motor 51 via a button.

The liftable sunlight lamp also includes an auxiliary light panel 7. The auxiliary light panel 7 is located on a light incident side of the light transmitting plate 32. Light from the auxiliary light panel 7 passes through the light transmitting plate 32. The light irradiation direction of the auxiliary light panel 7 is consistent with the light irradiation direction of the sunlight simulation device 1 to simulate the brightness of the sky.

The housing 6 is further provided with an environmental assembly 61 located in the irradiation direction of the sunlight simulation device 1 and configured to simulate the land and sea surface, making the projected light effect more realistic.

The liftable sunlight lamp further includes a sound source assembly 8. The sound source assembly 8 is configured to emit different music and environmental simulation sounds to match the start and rising-falling of the sunlight simulation device 1.

The liftable sunlight lamp also includes a control assembly 9. The control assembly 9 is electrically connected to the sunlight simulation device 1 and the driving member 5, respectively. The control assembly 9 is configured to control the light brightness of the sunlight simulation device 1, the start of the driving motor 51, and the playback of the sound source assembly 8. In this embodiment, the control assembly 9 includes a plurality of buttons and a circuit board. The circuit board is electrically connected to the above components respectively. The plurality of buttons correspond to a plurality of control modules on the circuit board, respectively. The user switches between different functions by pressing the buttons.

Although the present utility model has been described with reference to several exemplary embodiments, it should be understood that the terms used are for description and illustration rather than for limitation. As the present utility model can be implemented specifically in various forms without departing from the spirit or essence of the present utility model, it should be understood that the above-mentioned embodiments are not limited to any of the foregoing details, but should be broadly interpreted within the spirit and scope defined by the appended claims. Therefore, all variations and modifications falling within the scope of the claims or their equivalents should be covered by the appended claims.

The invention claimed is:

1. A liftable sunlight lamp, comprising a sunlight simulation device, a lifting device, a driving member, and a housing, wherein the sunlight simulation device is mounted on the lifting device, and the driving member drives the lifting device to move so as to drive the sunlight simulation device to move up and down;

wherein the sunlight simulation device comprises:

a light assembly, comprising a first light source and a plurality of second light sources, wherein the plurality of second light sources are circumferentially arranged at intervals, and the first light source is located at a center of the plurality of second light sources; and a light guide plate, fitted against the light assembly, wherein the light guide plate is fixedly provided with a light concentrating tube, the light concentrating tube is axially provided with a light guide hole penetrating through two ends, the first light source is disposed in alignment with one end of the light concentrating tube, and light from the first light source is emitted outward along the light guide hole;

wherein the lifting device comprises a slide rail extending in a vertical direction, and the driving member drives the sunlight simulation device to move up and down along the slide rail;

wherein the lifting device further comprises a slide block and a slide plate, the slide block is connected to the sunlight simulation device and moves along the slide rail, the slide plate is respectively connected to the driving member and the slide block, and the driving member drives the slide plate to move so as to drive the slide block to move;

wherein the driving member comprises a driving motor and a gear, the gear is disposed between the driving motor and the slide plate, and the driving motor drives the gear to rotate so as to drive the slide plate in a transmission mode to move;

wherein three gears are provided and are a first gear, a second gear, and a third gear, respectively, the first gear is connected to a driving end of the driving motor, the second gear is respectively engaged with the first gear and the third gear, a driving column is disposed protruding from a side surface of the third gear, the slide plate is provided with a driving groove extending transversely, the driving column is inserted into the driving groove, the third gear rotates circumferentially, and the driving column moves relatively transversely in the driving groove and simultaneously drives the slide plate to move vertically.

2. The liftable sunlight lamp according to claim 1, wherein the slide rail is provided with a sliding groove for vertical extension, the slide block is relatively fixed to the sunlight simulation device, and the slide block drives the sunlight simulation device to slide in the sliding groove.

3. The liftable sunlight lamp according to claim 2, wherein an inner wall of the sliding groove protrudes and extends toward a center direction, and the slide block and the sunlight simulation device respectively clamp the inner wall of the sliding groove.

4. The liftable sunlight lamp according to claim 1, further comprising an auxiliary light panel, wherein an irradiation direction of the auxiliary light panel is consistent with an irradiation direction of the sunlight simulation device.

5. The liftable sunlight lamp according to claim 1, wherein an environmental assembly is disposed in the housing, and the environmental assembly is located in the irradiation direction of the sunlight simulation device.

6. The liftable sunlight lamp according to claim 1, further comprising a sound source assembly, wherein the sound source assembly is configured to emit simulated sound.

7. The liftable sunlight lamp according to claim 1, further comprising a control assembly, wherein the control assembly comprises a plurality of buttons and a circuit board, and the control assembly is electrically connected to the sunlight simulation device and the driving member respectively.

8. The liftable sunlight lamp according to claim 1, wherein an inner wall of the light guide hole is provided with a smooth reflective surface to reflect and concentrate the light.

9. The liftable sunlight lamp according to claim 1, wherein a light shielding wall is disposed protruding from one side of the light guide plate where the light concentrating tube is located, and the light shielding wall extends circumferentially along an edge of the light guide plate and is connected end to end.

10. The liftable sunlight lamp according to claim 9, wherein the light guide plate is provided with a plurality of light through holes, the light through holes are aligned with the second light sources, and the plurality of light through holes are located within an enclosed range of the light shielding wall.

11. The liftable sunlight lamp according to claim 1, wherein the light guide plate is of a circular structure, and the light concentrating tube is located at a center of the light guide plate.

12. The liftable sunlight lamp according to claim 11, wherein four second light sources are provided, and the four second light sources are arranged at equal intervals along a circumference direction of the light guide plate.

13. The liftable sunlight lamp according to claim 1, further comprising a light homogenizing assembly, wherein the light homogenizing assembly is disposed on one side of the light assembly to perform light homogenization.

14. The liftable sunlight lamp according to claim 13, wherein the light homogenizing assembly comprises a light homogenizing sheet and a light transmitting plate, the light homogenizing sheet is provided with an avoidance hole for avoiding the light concentrating tube, the light homogenizing sheet covers a front of the plurality of second light sources, and the light transmitting plate is disposed in front of the light guide plate and located on irradiation paths of the first light source and the second light sources.

15. The liftable sunlight lamp according to claim 1, wherein the light assembly further comprises a control board, and the first light source and the second light sources are LED lamp beads embedded in the control board.

* * * * *